Dec. 27, 1966   M. A. CHAVANNES   3,294,389
LAMINATED CELLULAR MATERIAL
Filed June 29, 1965   3 Sheets-Sheet 1
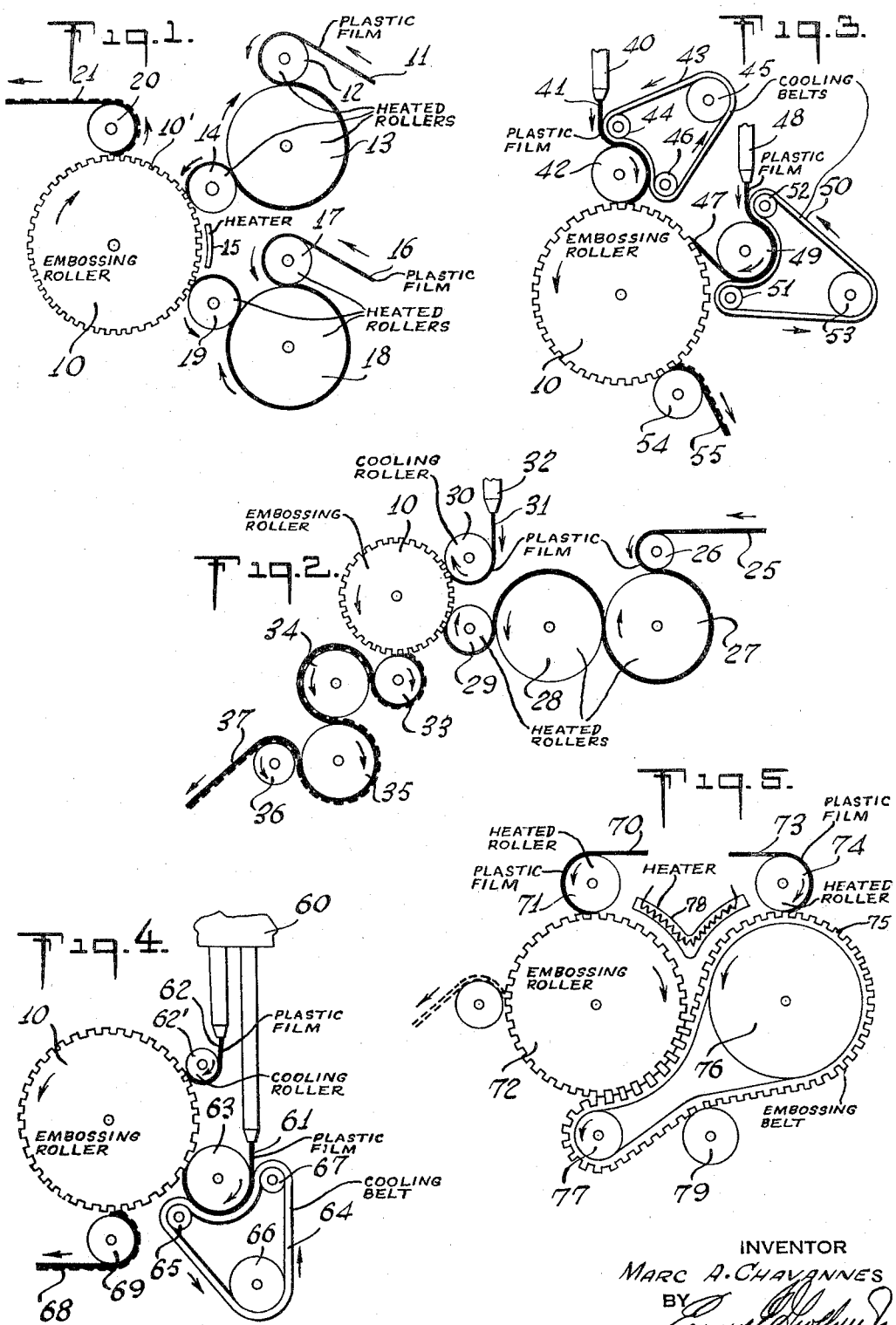
INVENTOR
MARC A. CHAVANNES
BY
ATTORNEY

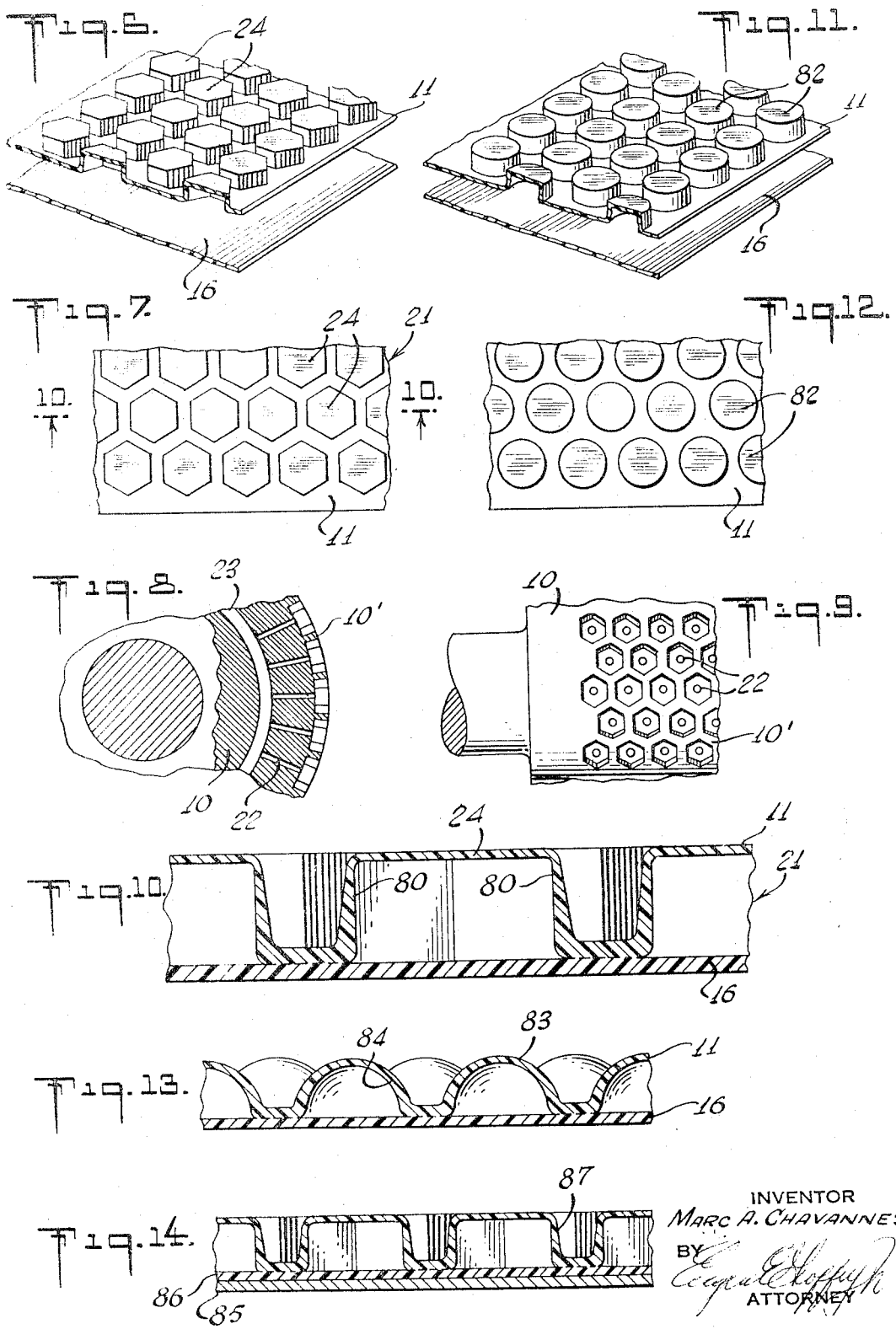

Dec. 27, 1966 M. A. CHAVANNES 3,294,389
LAMINATED CELLULAR MATERIAL
Filed June 29, 1965 3 Sheets-Sheet 3
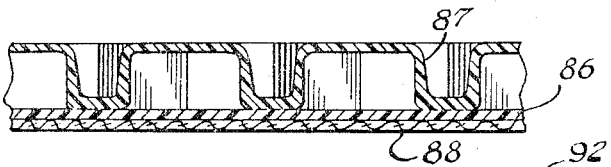
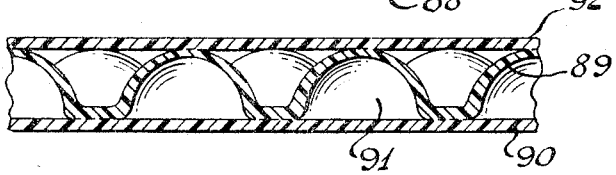
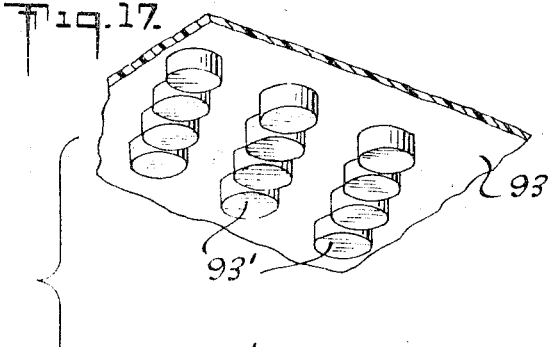
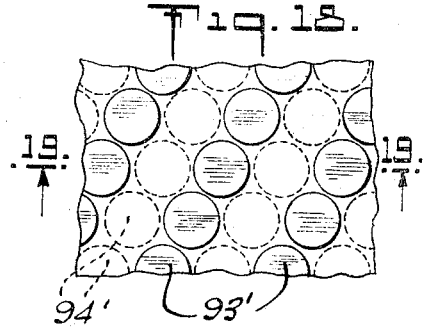
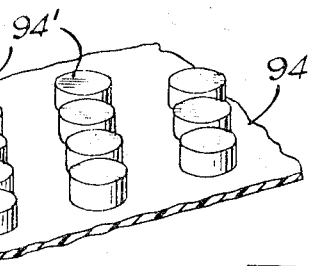
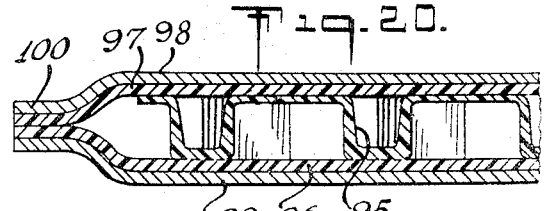
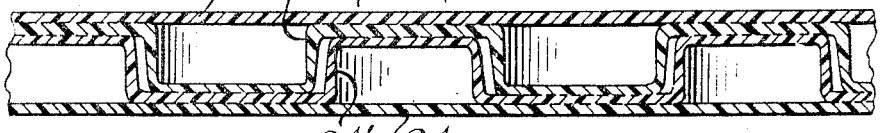
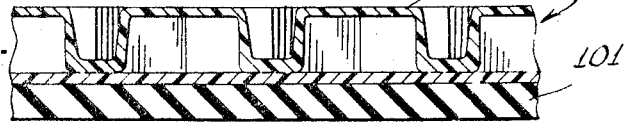
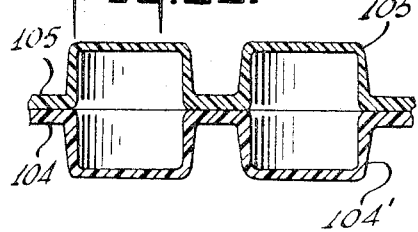
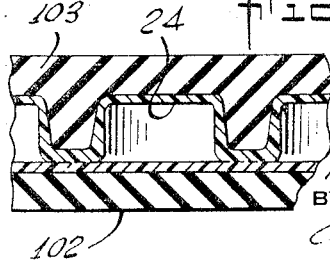
INVENTOR
MARC A. CHAVANNES
BY
ATTORNEY United States Patent Office 3,294,389
Patented Dec. 27, 1966

3,294,389
LAMINATED CELLULAR MATERIAL
Marc A. Chavannes, 165 W. 66th St.,
New York, N.Y. 10023
Filed June 29, 1965, Ser. No. 469,970
1 Claim. (Cl. 267—1)

This invention relates to laminated materials and more specifically concerns a new and improved cellular material which is useful, among other things, for cushioning and shock absorbing applications as, for example, packaging of products, padding of furniture, cars and trucks, heat insulation and the like.

Plastic sheet or film, and particularly thermoplastic film, is utilized in industry for many purposes and heat sealing techniques have been utilized for securing sections of film one to the other as in the formation of raincoats and the like. The lamination of plastics, however, has presented a serious problem and the use of adhesives is often relied upon in the attainment of that end. It has been found that while adhesives are satisfactory for many purposes, they often fail to provide a uniform and dependable bond and obviously result in a structure wherein the laminated elements maintain their identity as individual layers. Furthermore, the introduction of an adhesive is objectionable because of costly drying operations and the introduction of foreign material with different characteristics.

This invention has as one of its objectives the provision of an improved cellular material wherein the laminated sheets or films are fused to form a substantially unitary sheet with a permanent bond between the laminae.

A still further advantage of the invention resides in the provision of improved cellular products wherein the pneumatic cushioning or shock absorbing structure is coordinated with other cushioning materials such as natural and synthetic rubbers as well as other sheet materials to obtain modified cushioning characteristics, increased strength and the like.

The cellular material in accordance with the invention affords cushioning and shock absorbing action not obtainable by known materials within comparable size and weight limitations and at the same time the cost of this improved cellular material is far below the cost of other known materials affording equivalent characteristics.

This application is a continuation-in-part of United States patent application , Serial No. 328,422, entitled Laminated Cellular Material, filed December 5, 1963 which application is a continuation-in-part of United States Patent No. 3,142,599, entitled Method for Making Laminated Cellular Material, granted July 28, 1964, and filed November 27, 1959.

The above and other objects and advantages of the invention will become more apparent from the following description and accompanying drawings forming part of this application.

In the drawings:

FIGURE 1 is a diagrammatic view of one embodiment of apparatus for fabricating cellular material in accordance with the invention.

FIGURE 2 is a diagrammatic view of a modified apparatus for making cellular material by fusing a preformed film with a film extruded immediately prior to the lamination;

FIGURES 3 and 4 are diagrammatic views of still additional embodiments of apparatus for embossing and fusing two films immediately upon emergence from extrusion apparatus.

FIGURE 5 is a still further modification of apparatus in diagrammatic form and illustrates the lamination of two molded films.

FIGURE 6 is an exploded perspective view of one form of a molded and laminated product in accordance with the invention.

FIGURE 7 is a plan view of the structure shown in FIGURE 6.

FIGURE 8 is a diagrammatic fragmentary view of one form of a molding roller that may be utilized in connection with the apparatus shown in FIGURES 1 through 5 for the production of a molded film as illustrated in FIGURES 6 and 7.

FIGURE 9 is a side elevation of the roller as illustrated in FIGURE 8.

FIGURE 10 is a cross-sectional view of the material shown in FIGURE 7 and taken along the line 10—10 thereof.

FIGURE 11 is an exploded perspective view showing a modified embodiment of the invention.

FIGURE 12 is a plan view of the modified cushioning structure shown in FIGURE 11.

FIGURE 13 is a cross-sectional view of still another form of the invention utilizing hemispherical embossments.

FIGURES 14 and 15 illustrate further embodiments of the invention wherein materials such as paper and fabric are adhered to the cushioning product in accordance with the invention.

FIGURE 16 illustrates still another embodiment of the invention wherein the sealed embossments are retained between parallel sheets of material.

FIGURE 17 is an exploded view of a still further embodiment of the invention wherein two cushioning structures are sealed one to the other with the embossments of one structure meshing with the embossments of the other structure.

FIGURE 18 is a plan view of the assembled product of FIGURE 17.

FIGURE 19 is a cross-sectional view of FIGURE 18 taken along the line 19—19 thereof.

FIGURE 20 illustrates still another product in accordance with the invention wherein gas and moisture vapor barrier materials are combined with the cushioning product.

FIGURE 21 illustrates an improved combination of the cushioning product with a resilient material on one side thereof.

FIGURE 22 illustrates another improved combination of the cushioning material embedded within a resilient material.

FIGURE 23 is a cross-sectional view of still another product in accordance with the invention formed by sealing two molded films one to the other.

Broadly, the invention contemplates in one aspect the fusion of plastic sheet materials one to the other to form a unitary cellular laminate, and in another aspect the fabrication of a laminated plastic product having a plurality of closely spaced, discrete, sealed air pockets which afford a high degree of cushioning and shock absorbing action. It has been found that continuous sheets of plastic can be fused one to the other and form a good hermetic seal by heating at least the surfaces of the layers to a fusing temperature and then urging the heated surfaces into contact. This produces an immediate and permanent bond between the sheets being laminated and produces a homogeneous resultant product. This fusion sealing process is particularly useful for the fabrication of the improved cellular material as it affords a secure seal about each air pocket which is important for good cushioning action. In fabricating the cellular material in accordance with the invention at least one of the films or layers is heated and then molded by means of a female cylinder or other suitable means to form a plurality of individual cells or pockets. As successive portions of the layer are molded, the surfaces of the layer surrounding the cells are retained at a fusion temperature and a second film heated to a similar temperature is applied to form a unitary structure, with each of the molded portions or cells individually sealed to form a plurality of discrete pockets or hollow elements containing air or other fluid permanently sealed therein. While other procedures may be utilized to adhere the films one to the other, it has been found that the use of the foregoing heat fusing process affords the best results and produces more dependable and durable products. While any suitable plastic film may be utilized, excellent results have been attained with polyethylenes, polyolefins, polypropylenes, polyvinyl chlorides and its copolymer with polyvinyl acetate, polyvinylidene chloride, polyvinyl butyral and polystryrene as well as the thermosetting resins having a thermoplastic stage or being moldable before curing or vulcanizing like natural and synthetic rubbers and particularly butyl rubber.

Referring now to the drawings and more specifically to FIGURE 1, there is illustrated a molding roller 10 having a molded surface configuration for producing a plurality of discrete cells which may be of any desired shape or configuration and which preferably utilizes vacuum molding means. The term molding as used herein is intended to define a female roller as distinguished from a male or embossing roller. The product resulting from the molding operation, however, may properly be defined as embossed. More specifically, a first film 11 is fed onto the molding cylinder 10 by means of rollers 12, 13 and 14. These rollers are preferably heated at successively increasing temperatures in order to raise the temperature of the film 11 slowly and feed it onto the molding roller at a predetermined temperature. For instance, in the case of a low density polyethylene film the temperature of roller 12 may be maintained at approximately 180° to 200° F. while the rollers 13 and 14 would be maintained at about 230° to 240° F. It is to be understood, however, that these temperatures would necessarily vary depending on the nature of the thermoplastic, its softening and melting points as well as on the speed of the process and the thickness of the film, it being important that the surface layers of the films which are to be brought into contact one with the other are in the aforesaid fusing or tacky state.

With this improved process the surface portions of the embossed film are maintained at the fusing temperature of the particular plastic, for example 230° to 240° F. for low density polyethylene. One procedure for the attainment of this end involves the utilization of a heater 15, though a composite roller construction may be utilized wherein the salient portions of the molding roller include a surface layer of insulating material 10' to prevent cooling of the salient surfaces of the film while on the molding roller, which surfaces will form the bases of the molded cells. At the same time the remaining portions of the molded cells are reduced in temperature. A second film 16 is fed onto the molding roller by means of preheating rollers 17, 18 and 19. Here again, the rollers are preferably maintained at successively increasing temperatures so that the film 16 when applied to the molding roller will have a surface temperature of the order of the fusing temperature of the material. When the surface layer of the film 16 contacts the salient surfaces of the molded film 11, fusing is effected immediately by contact of the two films while pressure is maintained through the cooperation of the roller 10 with the cylinder 10. Thus, a firm heat and pressure seal is effected and the composite cellular material, as it travels about the remaining periphery of the cylinder 10 will cool to form a unitary structure and can be removed from the cylinder 10 by a stripping roller 20. The resultant cellular material is denoted by the numeral 21 and may be transported to other equipment for further processing or may be packaged in rolls or other suitable means.

An additional factor affecting the fusing operation in accordance with the invention is the pressure of roller 19 against the molding roller 10. Under the temperature conditions outlined above for low density polyethylene film of the order of a few mils in thickness, pressures of the order of 30 to 60 lbs. per square inch are very satisfactory. The required pressure is essentially an inverse function of film temperature.

One embodiment of cellular material that may be fabricated with the apparatus shown in FIGURE 1 is illustrated in FIGURES 6, 7 and 10, while somewhat more detailed views of one form of the molding roller 10 are shown in FIGURES 8 and 9. Referring to the latter figures, it will be observed that the roller 10 has inwardly formed recesses in the form of closely spaced hexagons and the heated plastic film is drawn into these openings by vacuum means including tubes 22 connected with a manifold 23.

FIGURE 6 is an exploded view showing the molded film 11 and the second laminating film 16 prior to their lamination. FIGURE 7 is a plan view showing the spacing of the hexagonal embossments 24, and it is evident that the use of such embossments affords an effective utilization of the area. FIGURE 10 is a cross-sectional view of the hexagonal elements shown in FIGURE 7 and will be discussed in greater detail. Actual tests have indicated that a permanent hermetic seal of each of the elements 24 is readily attainable by this invention and thereby affords excellent cushioning and shock absorbing action.

Other procedures useful for the fabrication of a composite structure in accordance with the invention are illustrated in FIGURES 2 through 5. In FIGURE 2 the heated molding roller is denoted by the numeral 10 and corresponds to the molding roller 10 of FIGURE 1. The film to be molded is denoted in this figure by the numeral 25 and fed to the molding roller by means of a series of rollers 26, 27, 28 and 29 of which at least the rollers 27 through 29 are heated to gradually raise the temperature of the film to a molding temperature for the particular plastic involved. The roller 10 preferably includes a suitable vacuum means for effecting the molding and the temperature of the film surface is maintained at or near the fusing point until it arrives at the sealing roller 30. A second plastic film 31 is carried directly from the extrusion apparatus denoted by the numeral 32 about the sealing roller 30 and then urged into contact with the molded film 25. This film 31 may be at a temperature of as high as 500° F. when leaving the extrusion apparatus and roller 30 must be maintained at a low enough temperature so that the film 31 will be lowered to the desired fusing temperature at the time of application to film 25. The roller 30 further provides the required sealing pressure to force the film 31 into firm contact with the film 25. Since the film 31 is at a fusing temperature wherein at least the surface layers of the film are fluid, the engagement of the two films will cause them to firmly adhere one to the other and permanently seal the areas about molded portions of the film 25 to form a plurality of air pockets, as previously described. The film cools gradually as it travels with the roller 10 maintained by the vacuum under at least part of the atmospheric pressure and is removed from the roller 10 by a stripping roller 33. The resultant laminate 37 may then be transported from the molding roller by successive rollers 34, 35 and 36. The rollers 34 and 35 are preferably cooled in order to insure complete cooling of the laminated cellular structure 37.

A still further modification of the method and apparatus for forming a laminated cellular material in accordance with the invention is illustrated in FIGURE 3. In this instance, as in the case of those forms of the invention shown in FIGURES 1 and 2, the molding roller is denoted by the numeral 10. A first extrusion means 40 extrudes a thin film 41 which passes about a roller 42 and is supported in its travel about that roller by a moving belt 43 carried by rollers 44, 45 and 46. One or more of the rollers 44 to 46 and belt 43 are preferably at a temperature that will lower the temperature of the extruded film to the fusing temperature just prior to lamination with the molded film denoted herein by the numeral 47. The film 47 is extruded by a suitable extruder 48 and is fed about the roller 49. The film is supported and protected in its transport about the roller 49 by a moving belt 50 carried by rollers 51, 52 and 53. These rollers together with the belt 50 are preferably at a temperature that will lower the temperature of the film to the molding temperature as previously described. The film 47 upon being fed onto the roller 10 will be molded and then laminated with film 41 to permanently seal the molded portions to form a plurality of closely spaced hermetically sealed pockets. As the composite film travels about the roller 10 it will cool and may be stripped from the molding roller by any suitable means as, for instance, the stripping roller 54. The film 55 may then be passed over suitable cooling rollers or subjected to other cooling means if the weight and thickness of the film requires it.

The apparatus diagrammatically illustrated in FIGURE 4 corresponds in certain aspects to that show in the previous figures. In this instance, however, double extruding means 60 are provided for the simultaneous extrusion of two films 61 and 62. The film 61 is fed about a roller 63 and is supported in its travel by a moving belt 64 carried by rollers 65, 66 and 67. The film 61 is then fed to the molding roller 10 and is there molded by vacuum or other suitable means. The film 62 is fed about the roller 62' and onto the molding roller and the roller 63 provides pressure contact between the films 61 and 62 to effect the heat fusing operation. The composite film 68 then cooled during its travel about the roller 10 and is stripped therefrom by a stripping roller 69. Thereafter the film may be further cooled and processed as may be desired.

In certain instances it may be desirable to provide a cellular material wherein both of the films to be laminated are molded and this end may be attained by the structure diagrammatically illustrated in FIGURE 5. In this form of the invention a first film 70 is fed about a pre-heated roller 71 to a vacuum molding roller denoted by the numeral 72, though it is evident that any other suitable molding means may be employed. A second film 73 is fed about a roller 74 into a vacuum molding belt 75 carried by rollers 76 and 77. The embossments on the belt 75 and the roller 72 are identical and are coordinated so that they overlie one another. The belt may be of any suitable construction that will provide vacuum means for effecting the molding of the film 73. Furthermore the films 70 and 73 may be preformed or they may be extruded directly into the apparatus as shown in FIGURES 3 and 4. In order to avoid unnecessary cooling of the outer surfaces of the molded films, it may be desirable to include appropriate heating means such as the electric heater 78 which will maintain at least the surface layers of the molded films in a slightly fluid or tacky condition to facilitate fusion. The fusion pressure is effected in this embodiment of the invention by maintaining the belt 75 in tension as it passes over the roller 72 and the pressure is controlled by a tension control roller denoted herein by the numeral 79. If desired, other tension or pressure means may be employed in order to effect this end, or a pair of cooperating molded rollers substantially identical to the roller 72 may be utilized to effect molding and also bring the two embossed films into pressure engagement. A product produced by this apparatus is illustrated generally in FIGURE 23 and will be described along with the other cellular structures illustrated generally in FIGURES 10 through 22. In certain instances it may be desirable to provide the sealed air pockets such as the pockets 16' as shown, for instance in FIGURES 6 and 7 with air at a pressure at or slightly higher than atmosphere as measured after the product has been cooled. Inasmuch as the sealing of the fluid filled elements to produce the laminated cellular structure may normally be carried out at atmospheric pressure and at a relatively high temperature, deflation of the pockets will result when the material is reduced to room temperature. Any suitable procedure may be used to correct or avoid this condition as, for instance, the performance of the sealing process in a higher pressure atmosphere so that upon cooling of the resultant product and its subjection to the normal atmospheric pressure, a selected pressure at or above atmospheric may be obtained within the pockets 16'. An alternative procedure to overcome deflation upon cooling involves reheating the cushioning material to slightly disemboss the material whereupon resultant contraction will produce somewhat smaller but fully inflated cells. The following fusion temperature table sets forth the ranges of fusing temperatures for several classes of fusible plastics, it being understood that within each class of plastics there are numerous specific varying characteristics.

*Fusion temperature table*

| Class of material to be fused: | Fusion temperatures in degrees Fahrenheit |
| --- | --- |
| Polyvinyl chloride and the co-polymers | 325 to 350 |
| Polyethylenes (low and medium density) | 240 to 270 |
| Polyethylene (high density) | 270 to 320 |
| Polystyrenes | 250 to 275 |
| Styrene blends | 280 to 330 |
| Polypropylenes | 280 to 330 |

While it is preferable to effect the fusion of the two films one to the other by the fusing process as described wherein at least the meeting surfaces of the film are raised to a fusing temperature and then brought into contact under appropriate sealing pressure, other procedures may be used to form the cushioning and shock absorbing materials now to be described, provided, however, that effective seals are produced.

The improved products in accordance with the invention, are shown generally in FIGURES 6, 7 and 10 through 23. The form of the invention shown in FIGURES 6 and 7 involves the utilization of hexagonal sealed embossments 24 and in FIGURE 10 it will be observed that each embossment 24 is provided with side walls 80 tapering so that the thinnest portion of the wall is farthest from the sealing film 16. The utilization of the tapered wall structure as indicated at 80 provides mechanical shock absorbing action and supplements the pneumatic action. For instance, the element 24 normally contains gas or other fluid sealed therein and when pressure is applied to compress this element, the walls will tend to expand and permit the element to be compressed. In many cases there is a point beyond which further compression cannot be withstood without rupturing the element 16'. In such an instance, the walls 80 will provide further support and, as the element itself is crushed, the walls will afford increasing resistance until such time as the structure is completely destroyed. Thus, the structure of FIGURES 7 and 10 provides both pneumatic as well as mechanical shock absorbing action and such action is ideal when the material is employed to protect objects that may be dropped from high elevations and which require substantial shock absorbing action even though the shock absorbers are crushed during the impact. One instance would be in the dropping of items from aircrafts or other similar vehicles in which case it is merely necessary to provide means to protect the article on impact.

The embossments 24 may be made of any desired shape or configuration with uniform or tapered walls and a modified structure is shown in FIGURES 11 and 12. In this case the sealed elements, denoted by the numeral 82, are circular in configuration and will afford a somewhat modified cushioning action.

Another consideration in the fabrication of the cellular material in accordance with the invention is the thickness of the films to be laminated. As the films are increased in thickness, additional shock resisting action will be provided. In certain cases it may be desirable to have embossed film of a fairly narrow gauge, as for instance, films of the order of 1 to 5 thousandths of an inch, while the backing film may be relatively stiff to lend support for the structure. Thus, any number of variations may be made in the thickness of the sealed films and the size and configuration of the embossments to attain any desired shock absorbing action.

FIGURE 13 illustrates still another embodiment of the invention wherein the sealed elements, denoted herein by the numeral 83, are in hemispherical form. A hemisphere has been found to provide a different type of shock absorbing action than the forms of the invention shown, for instance, in FIGURES 6 and 11 since the sphere can be compressed with a lighter force than that required to initiate compression on the previous forms of the invention, though the maximum resistance obtained from the hemispherical configuration is substantially the same as that obtained in the previous forms. With the hemisphere, however, the use of the tapered wall 84, while lending mechanical shock absorbing action, will not provide the degree of shock absorbing action that would be obtained, for instance, by the form of the invention shown in FIGURES 6 and 10.

In certain cases it may be desirable to utilize the cellular material in accordance with the invention with other laminated materials. In the case of packaging, for instance, it may be desirable to apply a coated paper to one side of the structure, and this is illustrated in FIGURE 14 wherein the paper, denoted by the numeral 85, is laminated to the sealing film 86. The sealing film is in turn laminated with an embossed film 87 as described in connection with FIGURES 1 through 5 inclusive.

When cellular material is utilized for furniture, rug padding or other similar applications, it may be desirable to utilize a fabric backing 88 as illustrated in FIGURE 15. In the case of paper and fabric laminates, as shown in FIGURES 14 and 15, the paper or fabric as the case may be is preferably first coated or laminated with the plastic layer 86 and then fused to the embossed layer 87, though other procedures may be used to attain the desired end. In the case of the paper and plastic laminate or the fabric and plastic laminate, such composite laminate may be substituted in place of the film 16 shown in FIGURE 1 in the fabrication of the cellular material.

FIGURE 16 illustrates still another embodiment of the invention wherein an embossed film 89 is provided with a sealing layer 90 fused thereto to provide a plurality of sealed pockets 91 and a second layer 92 is sealed to the outer portions of the embossed film 89 to provide a cellular material having two essentially coplanar surfaces. The film 92 in this form of the invention may be attached by heat sealing or by means of an appropriate adhesive, it being merely necesary to effect a good mechanical bond between the films 89 and 92, as hermetic seal is unnecessary. With this structure, it is possible to provide more uniform pressure distribution between the sealed elements 91 and, if desired, peripheral edges of the structure may be sealed in order to prevent the entrance of foreign matter, sects and the like. This is particularly important when utilized for furniture, packaging material and other similar purposes.

FIGURES 17 through 19 illustrate still another embodiment of the invention wherein two laminated cellular structures in accordance with the invention are combined to provide a single composite structure. It will be observed from FIGURE 17 that two separate cellular structures denoted by the numerals 93 and 94 are provided with the sealed embossments or tubular members 93' and 94' in relatively widely spaced relationship. Each of the structures 93 and 94 corresponds essentially to the structure shown in FIGURES 11 and 12 and may be of laminated plastic alone or combined with other materials as shown in FIGURES 14 and 15. The structures 93 and 94 are secured in overlying relationship with the molded tubular members 93' and 94' being in meshing relationship so that the total thickness of the structure is not appreciably greater than the total thickness of either one of the structures. The combined structure is illustrated in FIGURE 19 with the elements 93' shown in full line while the intermediate elements 94' are shown in dotted outline. The interweaving of these structures may be observed more clearly in FIGURE 19 which shows the cells or elements in a contiguous relationship and thereby affords greater structural strength.

FIGURE 20 illustrates still another form of the invention wherein the cellular material is enclosed within a gas and moisture vapor barrier. In this form the cellular material includes a suitably molded layer 95, a sealing layer 96, an overlying plastic layer 97, and upper and lower layers of aluminum foil or other similar material 98 and 99. The edges 100 are sealed about the entire periphery so that the cushioning means is completely protected.

In certain applications it is desirable to combine the resilient qualities of materials such as foam rubber with the cushioning qualities of the material embodying sealed air cells as previously described. For this purpose, a structure as shown for example, in FIGURE 21 may be employed wherein the cushioning structure such as shown in FIGURE 7, for instance, and denoted generally by the numeral 21 may be combined with layer of foam rubber 101 cemented or otherwise adhered to one side thereof. While rubber and rubber-like materials can be fabricated with a variety of resilience, they cannot afford the advantages of cushioning structures in accordance with the invention. However, should a wide range of cushioning action be desirable, it has been found advantageous to combine a layer of foam rubber or synthetic foam rubber having a very soft cushioning characteristic with a structure embodying a plurality of sealed elements in accordance with the invention. Thus, the characteristics of the two cushioning means will afford a composite material that will provide a shock absorbing and cushioning action not heretofore attainable with known structures. It is also apparent that more dense resilient materials may be utilized, depending on the character and nature of the shock absorbing and cushioning actions desired.

FIGURE 22 illustrates a further embodiment of the invention wherein the cushioning material such as the material 21 previously described is completely enclosed within natural or synthetic rubber materials of any desired density. One layer 102 of the natural or synthetic rubber is adhered to one side of the structure 21 while a second layer 103 is adhered to the other side of the structure with the material 103 filling in the spaces between the sealed cellular elements 16'. In this way, the material 103 not only affords additional resiliency, but lends support for the cellular elements 16'. This form of the invention is particularly useful for furniture padding, mattresses and the like and materially reduces the cost of the structure while affording more desirable cushioning action.

FIGURE 23 illutrates still another modification of the invention involving the sealing of two embosed films in back-to-back relationship. In this form the invention, two embossed films 104 and 105 having a plurality of embossed elements 104' and 105' are heat sealed one to the other to form a plurality of sealed pockets. With this arrangement, additional cushioning can be effected and by utilizing the tapered configuration of the embossed elements, as previously described, mechanical cushioning combined with a pneumatic cushioning can be effected.

The improved fusing technique in accordance with this invention wherein molded sheet material is heat sealed to a second layer of material by properly maintaining at least the meeting surfaces in a fusing or tacky form before pressing them together to form a substantially unitary resultant structure enables the introduction of other materials between the sealed layers for protection against moisture vapor, fungi, bacteria, insects or rodents, fire and other similar purposes. For instance, just prior to the heat sealing of the overlying embossed and sealing layers, powdered calcium silicate or calcium stearate may be introduced to absorb moisture and water vapor and provide a completely dry atmosphere within the sealed elements. If desired, a suitable compound of boron and ammonium sulphate may be introduced between the layers immediately prior to the fusion for fire-proofing purposes.

From the foregoing description, it is evident that the cellular materials in accordance with the invention may be made of a wide range of plastic materials and in any desired shape, size and configuration to meet the desired needs. The characteristics of the plastics utilized is also of importance since soft cushioning can be attained with highly platicized thin films while firmer action results with the use of heavier films having reduced amounts of plasticizer.

While only certain embodiments of the invention have been illustrated and described, it is understood that modifications, alterations and changes may be made without departing from the true scope and spirit thereof as defined by the appended claim.

What is claimed is:

A cellular cushioning material comprising a pair of cellular structures each having at least two sheets of relatively thin pliable material hermetically sealed one to the other with one of said sheets having a plurality of sealed gas retaining tubular members formed integrally therewith and extending therefrom, said tubular members on said structures being spaced to provide alternating patterns of tubular members and spaces with the spaces of one structure being arranged to correspond to the positions of said tubular members on the other structure, said structures being secured one to the other with the tubular members of one structure registering with and nesting in the spaces on said other structure and forming a resultant cushioning material having said tubular members uniformly distributed and closely spaced throughout the area thereof whereby said members afford mutual lateral support when the material is subjected to pressure.

References Cited by the Examiner
UNITED STATES PATENTS

| | | | |
|---|---|---|---|
| 1,875,188 | 8/1932 | Williams | 161—136 X |
| 1,997,389 | 4/1935 | Palmer | 161—137 X |
| 3,018,015 | 1/1962 | Agriss et al. | |

MORRIS SUSSMAN, *Primary Examiner.*